[11] 3,546,378

[72] Inventor Toru Karikawa
Tokyo-to, Japan
[21] Appl. No. 685,385
[22] Filed Nov. 24, 1967
[45] Patented Dec. 8, 1970
[73] Assignee Asahi Kogaku Kogyo Kabushiki Kaisha
Tokyo-to, Japan
a corporation of Japan
[32] Priority Dec. 20, 1966
[33] Japan
[31] 42/21,039

[54] TELEVISING AND PHOTOGRAPHING APPARATUS
5 Claims, 1 Drawing Fig.

[52] U.S. Cl. 178/7.1; 95/12; 350/173
[51] Int. Cl. H04n 5/26
[50] Field of Search 178/7.1, 7.1(A), 7.2, 7.2(D), 7.7, 7.8, 7.6, 6.8, 7.89, 7.88; 95/14, 14(X), 12, 86(X); 350/19, 19UX, 173, 172, 171, 169

[56] References Cited
UNITED STATES PATENTS

| | | | |
|---|---|---|---|
| 2,561,612 | 7/1951 | Culver | 178/7.89 |
| 2,838,601 | 6/1958 | Cavanagh et al. | 350/173 |
| 3,008,396 | 11/1961 | Mito | 95/12 |
| 3,225,140 | 12/1965 | Ferber et al. | 178/7.88 |

*Primary Examiner*—Robert L. Griffin
*Assistant Examiner*—Alfred H. Eddleman
*Attorney*—Stanley Wolder

ABSTRACT: A mirror is swingably supported in a housing between the objective lens and image tube of a television camera and is movable between an advanced position at an angle to the lens optical axis between the lens and image tube and spring urged to a retracted position. A single lens reflex camera box with an automatic diaphragm-actuating element is mounted on the mirror housing and supports the film at the objective lens advanced mirror reflected focal plane, with the diaphragm-actuating element engaging the mirror. The picture viewed on the television receiver may thus be directly photographed through the television camera objective lens without the intervention of the television system.

PATENTED DEC-8 1970 3,546,378
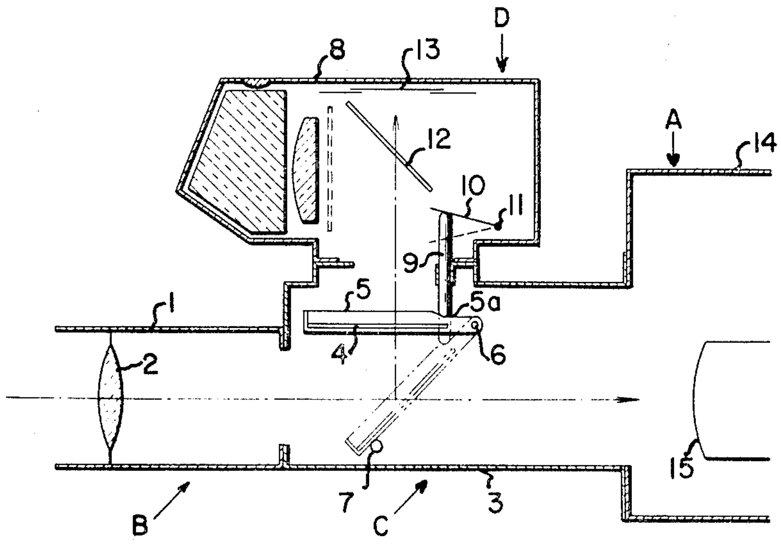
INVENTOR
TORU KARIKAWA
BY Stanley Wolder
ATTORNEY

TELEVISING AND PHOTOGRAPHING APPARATUS

BACKGROUND OF THE INVENTION

The present invention relates generally to improvements in photography and it relates particularly to an improved apparatus for the photographing of television transmitted pictures.

It is frequently desirable to photograph pictures which are picked up by a television camera and observed on the screen of a television receiver. The common practice is to photograph the picture appearing on the television receiver screen but this procedure possesses numerous drawbacks and disadvantages. The picture appearing on the television receiver screen is generally of very low resolution and of low fidelity, distortions being usually introduced between the television camera screen and the television receiver screen. Moreover, the light intensity of the picture appearing on the conventional television receiver screen is frequently low thereby limiting the versatility and usefulness of this procedure which otherwise leaves much to be desired.

SUMMARY OF THE INVENTION

It is a principal object of the present invention to provide an improved photographing apparatus.

Another object of the present invention is to provide an improved apparatus for photographing pictures which are observed on a television receiver screen and picked up by an associated television camera.

Still another object of the present invention is to provide a television associated apparatus for photographing pictures viewed by the television camera without the distortion and loss of resolution generally accompanying the television transmission and reception of such pictures.

A further object of the present invention is to provide an apparatus of the above nature characterized by its simplicity, low cost, reliability, versatility, adaptability and the use of standard commercially available equipment with a minimum of modification.

The above and other objects of the present invention will become apparent from a reading of the following description taken in conjunction with the accompanying drawing which illustrates a preferred embodiment thereof.

In a sense the present invention contemplates the provision of a viewing and photographing apparatus comprising an objective lens, a television camera including an image tube having a photosensitive screen positioned in the focal plane of said objective lens, a mirror swingable between an advanced position intersecting at an angle the optical axis of said lens between said lens and said screen and a retracted position, a film exposure device including means for supporting a film at the focal plane of said objective lens by way of said mirror and when in its advanced position and a shutter, and means for swinging said mirror to said advanced position attendant to the opening of said shutter.

According to a preferred form of the improved apparatus there is provided a mirror housing mounted on the television camera casing and communicating therewith and supporting the objective lens barrel at an end opposite the television camera, the mirror being swingably supported in the housing and spring urged to a retracted position. A single lens reflex camera box of the automatic preset diaphragm type is mounted atop the mirror housing with its front opening facing the mirror. The camera box is provided with the conventional diaphragm-actuating member which is coupled to the mirror by way of a slide rod so that with the opening of the shutter, the actuating member pushes the slide rod which advances the mirror to its advanced position during the film exposure interval. The action is rapid, interfering very little with the television picture transmission and providing a permanent record or picture of high resolution and fidelity and not having the distortion which frequently characterizes a televised picture.

BRIEF DESCRIPTION OF THE DRAWING

The drawing is a longitudinal sectional view of an apparatus embodying the present invention.

DESCRIPTION OF THE PREFERRED EMBODIMENT

Referring now to the drawing which illustrates a preferred embodiment of the present invention, the reference letter A generally designates a television camera provided with an objective lens system B which is mounted thereon by an intermediate swinging mirror assembly C. A camera body D is associated with the mirror assembly C and cooperates therewith in the manner hereinafter set forth.

The television camera A is of generally conventional construction and includes a casing 14 which houses a picture tube having a photosensitive face or screen 15 directed toward an opening in the front wall of the casing 14. The casing 14 also houses the electrical network associated with the camera and the television camera A is energized and coupled in the known manner either directly or by way of a transmitter to a television receiver having a picture tube on the screen of which is reproduced a picture of the image projected on the photosensitive screen 15.

Mounted on the front wall of the casing 14 in any suitable manner is a casing 3 having longitudinally aligned openings formed in the front and rear walls thereof, the rear opening registering with the television camera front opening. The lens system B is of conventional construction and includes a longitudinally extending lens barrel 1 which is separably coupled in the known manner to the front wall of the housing 3 in registry with the opening therein, the barrel 1 being in longitudinal alignment with the photosensitive screen 15. An objective lens system 2, schematically illustrated, is housed in the barrel 1, and may be of the multielement type of any desired construction, the optical axis of the lens 2 being coaxial with and perpendicular to the screen 15 which is positioned in the focal plane of the lens system 2.

A longitudinally extending mirror mounting frame 5 is supported at its rear edge by a transversely extending shaft 6 located in the upper part of the housing 3 rearwardly of the front thereof. The frame 5 carries a flat mirror 4 which is swingable with the frame 5 about the shaft 6 between a horizontal retracted position, shown in full line in the drawing, above the light path between the objective lens 2 and the photosensitive screen 15, and an advanced position, shown in broken line in the drawing, in which the mirror 4 intersects the optical axis of the objective lens at an angle of 45°. The frame 5 and mirror 4 are spring urged or biased to their normal retracted position.

The camera box D is of the conventional single lens reflex type employing an automatic preset diaphragm objective lens and includes a casing 8 which houses a shutter, means for advancing a film 13 across the camera box focal plane, a mirror 12 swingable between an advanced and retracted position attendant to the exposure procedure and the other mechanisms normally associated with the single lens reflex camera. The camera objective lens is omitted and the camera box D is suitably coupled to the top wall of the housing C with the front object lens opening of the camera box D registering with the top opening in the housing C and in vertical axial alignment with the mirror 4. When the mirror 4 is in its advanced position the film 13 lies in the focal plane of the objective lens 2 as reflected by the advanced mirror 4.

The camera box D is provided in the known manner with an automatic diaphragm actuating member 10 in the form of an arm swingably supported at its end by a pivot 11. The actuating arm 10 is normally in a raised retracted position as shown by full line in the drawing and upon depression of the camera shutter release button the arm swings to a lower advanced position, as shown in broken line, immediately prior to the opening of the shutter. A vertical rod 9 is vertically slidably supported by a bracket mounted on the housing C and extends between the free end of the actuating arm 10 and the mirror frame 5 at a point spaced from the shaft 6 so that the advance of the arm 10 effects the advance of the frame 5 and mirror 4 by the rod 9 until its lower border abuts a stop member 7 located in the housing C, in which advance position the mirror 4 intersects the objective lens optical axis at a 45° angle. Upon retraction of the arm 10 the mirror 4 and frame 5 are spring urged to their retracted position.

In the operation of the apparatus described above, under normal televising conditions the various components are in their retracted positions illustrated by full line in the drawing, so that the picture image is focused on the photosensitive screen 15 by the objective lens 2 and the televised picture is observed on the television receiver screen. When it is desired to photograph a television viewed picture, the shutter release member of the camera box D is actuated, to advance the actuating arm 10 which in turn advances the mirror 4 to its broken line shown position, and to swing the mirror 12 to its withdrawn position, shown by broken line, so that the image is focused by the objective lens on the plane of the film 13. Thereafter the camera shutter is opened and closed to expose the film 13. Upon completion of the photography operation the mirror 12, the actuating member 10, the pin 9, the mirror support frame 5 and the mirror 4 are returned to their retracted positions as shown by full line in the drawing in accordance with the conventional operation of a single lens reflex automatic preset diaphragm camera, so that the image is again focused on the photosensitive screen 15 of the television camera to continue the televising of the picture. The photographing sequence is very rapid so that the television interruption is so small as to be practically insignificant. Moreover, since the photography is effected directly through the television camera objective lens the loss of resolution and the distortion consequential to the televising of the picture are eliminated.

While there has been described and illustrated a preferred embodiment of the present invention, it is apparent that numerous alterations, omissions and additions may be made without departing from the spirit thereof.

I claim:

1. A viewing and photographing apparatus comprising an objective lens, a television camera including an image tube having a photosensitive screen positioned in the focal plane of said objective lens, a mirror swingable between an advanced position intersecting the optical axis of said lens between said lens and said screen and at an angle to said optical axis and a retracted position, a single lens reflex camera box including means for supporting a film at the focal plane of said objective lens by way of said mirror when in its advanced position and a shutter and an automatic preset diaphragm-actuating member coupled to said mirror and defining means for swinging said mirror to said advanced position attendant to the opening of said shutter.

2. The apparatus of claim 1 wherein said mirror is normally resiliently urged to a retracted position.

3. The apparatus of claim 1 wherein said mirror is spring biased to a retracted position and said diaphragm-actuating member comprises an arm swingable to an advanced position attendant to the opening of said shutter, and including an axially movable rod extending between the free end of said arm and said mirror at a point spaced from the swing axis of said mirror.

4. The apparatus of claim 1 comprising a television camera housing having a front opening, a mirror housing mounted on the front of said television camera housing and having a rear opening registering with said television camera housing front opening and a side opening and a front opening, a barrel housing said objective lens mounted on said mirror housing in registry with said front opening therein, said mirror being swingably supported in and said mirror housing, said single lens reflex camera box having a front opening registering with said mirror housing side opening.

5. The apparatus of claim 4 wherein said mirror is spring biased to a retracted position and said diaphragm actuating member comprises an arm swingable to an advanced position attendant to the opening of said shutter and including an axially movable rod extending between the free end of said arm and said mirror at a point spaced from the swing axis of said mirror.

UNITED STATES PATENT OFFICE
CERTIFICATE OF CORRECTION

Patent No. 3,546,378 Dated December 8, 1970

Inventor(s) Toru Karikawa

It is certified that error appears in the above-identified patent and that said Letters Patent are hereby corrected as shown below:

On the title page [31], "42/21,039" should read -- 41/116324 --.

Signed and sealed this 25th day of May 1971.

(SEAL)
Attest:

EDWARD M.FLETCHER,JR.
Attesting Officer

WILLIAM E. SCHUYLER, J
Commissioner of Patent